United States Patent
Lee et al.

(10) Patent No.: US 8,382,315 B2
(45) Date of Patent: Feb. 26, 2013

(54) ILLUMINATION APPARATUS HAVING TWO ENDS CONNECTED TO DIFFERENT FLUORESCENT SOCKETS

(75) Inventors: Young Hwan Lee, Seoul (KR); Kwan Soo Jang, Seoul (KR); Chung Hyun Cho, Goyang-si (KR)

(73) Assignee: Dongbu HiTek Co., Ltd. (KR)

( * ) Notice: Subject to any disclaimer, the term of this patent is extended or adjusted under 35 U.S.C. 154(b) by 385 days.

(21) Appl. No.: 12/684,851

(22) Filed: Jan. 8, 2010

(65) Prior Publication Data

US 2010/0176743 A1    Jul. 15, 2010

(30) Foreign Application Priority Data

Jan. 9, 2009 (KR) .................. 10-2009-0001710

(51) Int. Cl.
*F21V 1/00* (2006.01)
(52) U.S. Cl. .......... 362/217.08; 362/249.02; 439/620.21
(58) Field of Classification Search ............. 315/51, 315/185 R, 185 S, 291, 307, 308; 362/227, 362/249.01, 249.02, 253, 378, 800, 217.08; 439/620.01, 620.02, 620.21
See application file for complete search history.

(56) References Cited

U.S. PATENT DOCUMENTS

| 6,853,151 | B2 * | 2/2005 | Leong et al. | 315/185 R |
|---|---|---|---|---|
| 6,997,576 | B1 * | 2/2006 | Lodhie et al. | 362/240 |
| 7,344,275 | B2 * | 3/2008 | Allen et al. | 362/249.01 |
| 8,093,823 | B1 * | 1/2012 | Ivey et al. | 315/246 |
| 2006/0193131 | A1 * | 8/2006 | McGrath et al. | 362/227 |
| 2006/0203482 | A1 * | 9/2006 | Allen et al. | 362/227 |
| 2010/0117550 | A1 * | 5/2010 | Lee et al. | 315/250 |
| 2010/0117558 | A1 * | 5/2010 | Lee | 315/294 |
| 2010/0117559 | A1 * | 5/2010 | Lee | 315/294 |
| 2010/0118148 | A1 * | 5/2010 | Lee | 348/164 |
| 2010/0118555 | A1 * | 5/2010 | Lee | 362/418 |

* cited by examiner

*Primary Examiner* — Thuy Vinh Tran
(74) *Attorney, Agent, or Firm* — The Law Offices of Andrew D. Fortney; Andrew D. Fortney

(57) ABSTRACT

An illumination apparatus includes an adapter that is detachably and electrically connected a fluorescent lamp socket; a power supply unit in the adapter to supply power; a light emitting device driver that generates driving power from the power supplied by the power supply unit; a controller that controls the light emitting device driver; and a light emitting device illumination unit that emits light according to the driving power from the light emitting device driver and that is electrically connects the power supply unit to another fluorescent lamp socket.

17 Claims, 5 Drawing Sheets

ILLUMINATION APPARATUS HAVING TWO ENDS CONNECTED TO DIFFERENT FLUORESCENT SOCKETS

The present application claims priority under 35 U.S.C. §119(a)-(d) to Korean Patent Application No. 10-2009-0001710 (filed on Jan. 9, 2009), which is hereby incorporated by reference in its entirety.

BACKGROUND

Description of the Related Art

The present disclosure relates to an illumination apparatus.

At the present time, a fluorescent lamp or an incandescent lamp has been widely used as an illumination apparatus. In particular, the fluorescent lamp has low power consumption and high brightness so that it has been widely used in the office and in the home.

Meanwhile, an illumination apparatus that replaces the fluorescent lamp or the incandescent lamp has been recently developed and, representatively, an illumination apparatus using a light emitting diode (LED) has been introduced. However, in the case of the illumination apparatus using the LED, it is driven with a different voltage than the fluorescent lamp or the incandescent lamp. As a result, power supply apparatuses may not be useable with LED lamps.

SUMMARY

The present disclosure provides an illumination apparatus using an LED or an organic light emitting diode (OLED).

The present disclosure provides an illumination apparatus including an LED or an OLED that can be used without replacing the power supply apparatus installed for existing fluorescent or incandescent lamps.

The present disclosure provides an illumination apparatus that can compatibly use various lamp sockets and power supplies by detachably installing an adapter and a lamp.

The present disclosure also provides an illumination apparatus that can adaptively control a lamp according to the type of lamp that is installed.

An illumination apparatus according to the present disclosure includes an adapter that is detachably and electrically connected to one of fluorescent sockets; a power supply unit is installed in an adapter to supply power; a light emitting device driver that generates driving power by power supplied from the power supply unit; a controller that controls the light emitting device driver; and a light emitting device illumination unit that is light-emitted according to the driving power supplied from the light emitting device driver and electrically connects the power supply unit to another of the fluorescent sockets.

An illumination apparatus according to the present disclosure includes: an adapter that is detachably and electrically connectable to a first fluorescent lamp socket; and a light emitting device illumination unit having one end connected to the adapter and an opposite end connectable to another of the fluorescent sockets and that electrically connects the adapter to a second fluorescent socket, the light emitting device illumination unit emitting light according to a driving power (e.g., from the adapter).

DETAILED DESCRIPTION

Figure 1:
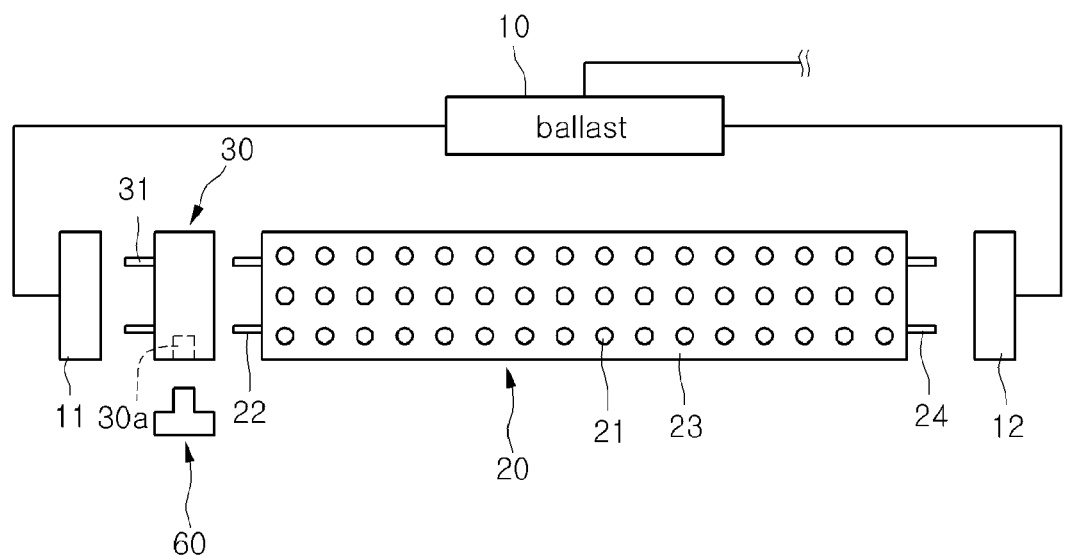
FIG. 1 is a diagram for explaining an exemplary illumination apparatus according to one or more embodiments of the present disclosure.

In the drawings, the thickness or size of each layer is exaggerated, omitted or schematically illustrated for the convenience and clarity of explanation. Also, the size of each constituent does not completely reflect its actual size.

Hereinafter, an illumination apparatus according to embodiments of the present disclosure will be described in detail with reference to the accompanying drawings.

Figure 2:
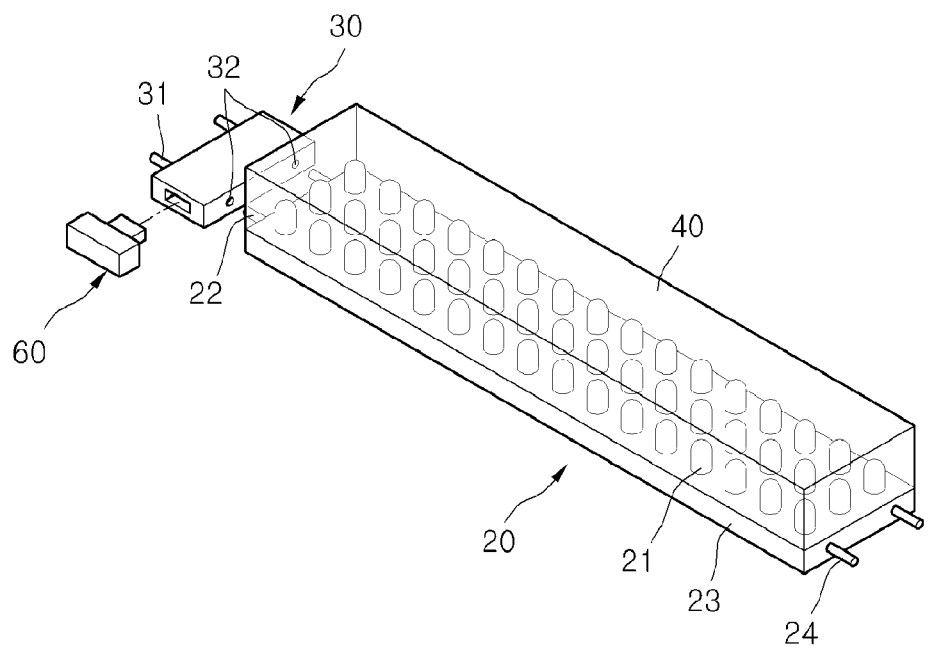
FIG. 2 is a perspective view of the exemplary illumination apparatus according to FIG. 1.
Figure 3:
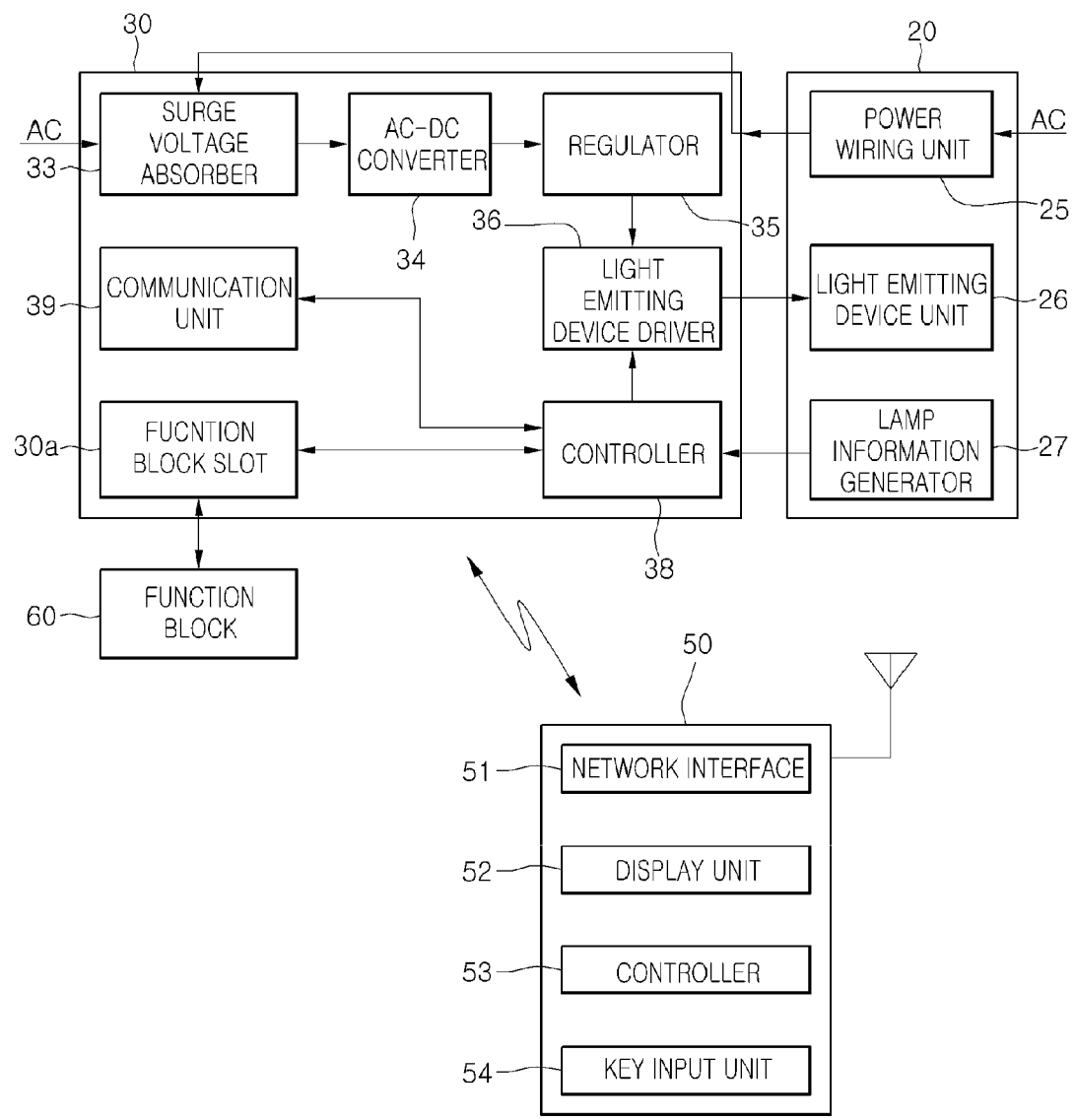
FIG. 3 is a block diagram for explaining an exemplary configuration of the illumination apparatus according to various embodiments.

FIG. 1 is a diagram for explaining an exemplary illumination apparatus according to embodiments of the disclosure, and FIG. 2 is a perspective view of the illumination apparatus according to FIG. 1. FIG. 3 is a block diagram for explaining an exemplary configuration of the illumination apparatus according to various embodiments.

Referring first to FIGS. 1 and 2, an exemplary illumination apparatus includes a lamp including a light emitting device illumination unit 20 and an adapter 30 that drives (e.g., provides power to) the lamp.

The light emitting device illumination unit 20 includes a plurality of light emitting devices 21 installed in or mounted on a substrate 23. A connector 22 for electrical connection to the adapter 30 is on one side or end of the substrate 23, and a second power supply terminal is on the opposite side or end of the substrate 23. Further, a cover 40 for protecting the light emitting devices 21 may be installed on or attached or affixed to the substrate 23.

One side or end of the adapter 30 includes a connector groove (or holes or a socket) 32 into which the connector 22 is inserted, such that the adapter 30 can be electrically and mechanically connected to the light emitting device illumination unit 20. The opposite side or end of the adapter 30 includes a first power supply terminal 31.

The illumination apparatus according to FIGS. 1-2 can replace an existing fluorescent lamp. In other words, the present illumination apparatus may be installed in first and second sockets 11 and 12 (in which an existing fluorescent lamp can be installed) by connecting the light emitting device illumination unit 20 and the adapter 30. Therefore, the illumination apparatus according to FIGS. 1-2 including light emitting devices 21 (such as LEDs or OLEDs) can be installed without replacing a power supply apparatus or the first and second sockets 11 and 12 for existing fluorescent lamps.

Currently, the power supply apparatus for most fluorescent lamps includes first and second sockets 11 and 12 that provide power to the lamp. The first and second sockets 11 and 12 are supplied with power through a ballast 10. Therefore, the illumination apparatus according to FIGS. 1-2 can be supported on the first and second sockets 11 and be electrically connected thereto by inserting a first power supply terminal 31 of the adapter 30 and a second power supply terminal 24 of the light emitting device illumination unit 20 into the first and second sockets 11 and 12.

Power supplied to the first socket 11 is directly supplied to the adapter 30, and power supplied to the second socket 12 is supplied to the adapter 30 through the substrate 23 of the light emitting device illumination unit 20. The adapter 30 receives power from the first socket 11 and the second socket 12 to drive the light emitting device illumination unit 20.

Although the adapter 30 receives power from the first socket 11 and the second socket 12 to drive the light emitting device illumination unit 20, the light emitting device illumination unit 20 can be driven by power supplied only from the first socket 11 or the second socket 12.

Meanwhile, since the light emitting device illumination unit 20 and the adapter 30 are detachably installed, when defects occur in the light emitting device illumination unit 20 or the adapter 30, one can replace only the defective unit (i.e., light emitting device illumination unit 20 or the adapter 30). Consequently, the illumination apparatus according to FIGS. 1-2 may have low maintenance costs.

In addition, the illumination apparatus according to FIGS. 1-2 has an advantage in that a variety of different illumination atmospheres can be created by replacing only the light emitting device illumination unit 20 since the light emitting device illumination unit 20 and the adapter 30 are detachably installed.

Further, the illumination apparatus according to FIGS. 1-2 is provided so that the adapter 30 can recognize the type of the light emitting device illumination unit 20 and thus, adaptively control the light emitting device illumination unit 20. Therefore, the illumination apparatus according to another embodiment can be used to freely select the light emitting device illumination unit 20 from among various models manufactured by various manufacturers. This will be described in more detail below.

In the light emitting device illumination unit 20, the plurality of light emitting devices 21 are arranged on the substrate 23. The light emitting devices 21 may each comprise an LED or an OLED. The substrate 23 may include wiring for supplying power to the light emitting device 21 from the adapter 30, and wiring for supplying power supplied the second socket 12 to the adapter 30. For example, the substrate 23 may comprise a printed circuit board (PCB) or a flexible substrate having excellent heat dissipating properties.

In addition, a reflective coating layer (not shown) may be formed on the surface of the substrate 23, making it possible to increase efficiency of light emitted from the light emitting devices 21. The reflective coating layer may comprise a reflective metal, such as silver (Ag) or aluminum (Al).

Each of the plurality of light emitting devices 21 may include an LED or an OLED that emits red, blue, green, or white light. Alternatively, each of the light emitting devices 21 (e.g., an LED or OLED) can emit yellow, orange, purple, violet, or ultraviolet light. The light emitting device illumination unit 20 may include subsets of light emitting devices 21, each subset emitting a different color.

The cover 40 may comprise a transparent plastic material and may have one or more colors such as red, green, blue, yellow, orange, purple, violet, etc., if necessary and/or desired. In addition, the cover 40 may be made of a translucent material, in which case it may also provide an illumination with a soft atmosphere.

Further, the exemplary adapter 30 includes a function block slot 30a in which a function block 60 can be inserted. The function block 60 may include an infrared sensor, an image sensor, and/or a fire sensor function.

Referring to FIG. 3, in the present illumination, the adapter 30 may include a surge voltage absorber 33, an AC-DC converter 34, a regulator 35, a light emitting device driver 36, a controller 38, a communication unit 39, and a function block slot 30a. The light emitting device illumination unit 20 may further include a power wiring unit 25, a light emitting device unit 26, and a lamp information generator 27.

In more detail, the function block slot 30a of the adapter 30 may have inserted therein a function block 60. For example, the function block 60 may include a USB connector, and the function block slot 30a may include a slot in which the USB connector can be inserted. An interface and a communication scheme between the function block slot 30a and the function block 60 can be variously selected.

The power supply unit that supplies power in the adapter 30 may include the surge voltage absorber 33, the AC-DC converter 34, and the regulator 35.

Figure 4:
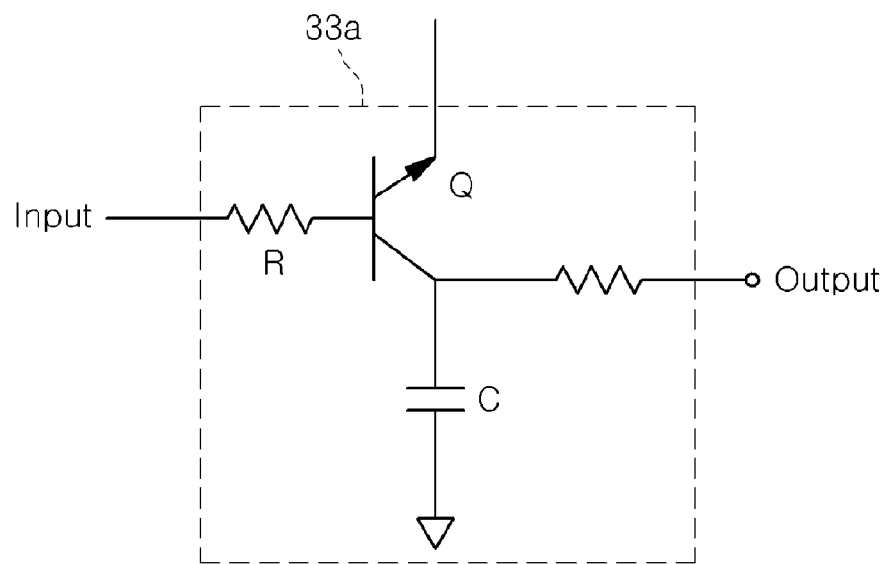
FIG. 4 is a diagram showing an exemplary surge voltage absorber in the illumination apparatus according to various embodiments.

When a surge voltage for lighting a fluorescent lamp is applied from the ballast 10, the surge voltage absorber 33 is configured to absorb the surge voltage. For example, as shown in FIG. 4, the surge voltage absorber may include a surge voltage absorbing circuit 33a, comprising an input resistor a bipolar transistor (e.g., similar in function and/or structure to a silicon controlled rectifier), and a resistor-capacitor (RC) circuit at the output. The surge voltage absorber 33 receives an AC power from the first socket 11 and an AC power from the second socket 12 (through the power wiring unit 25 of the light emitting device illumination unit 20).

Figure 5:
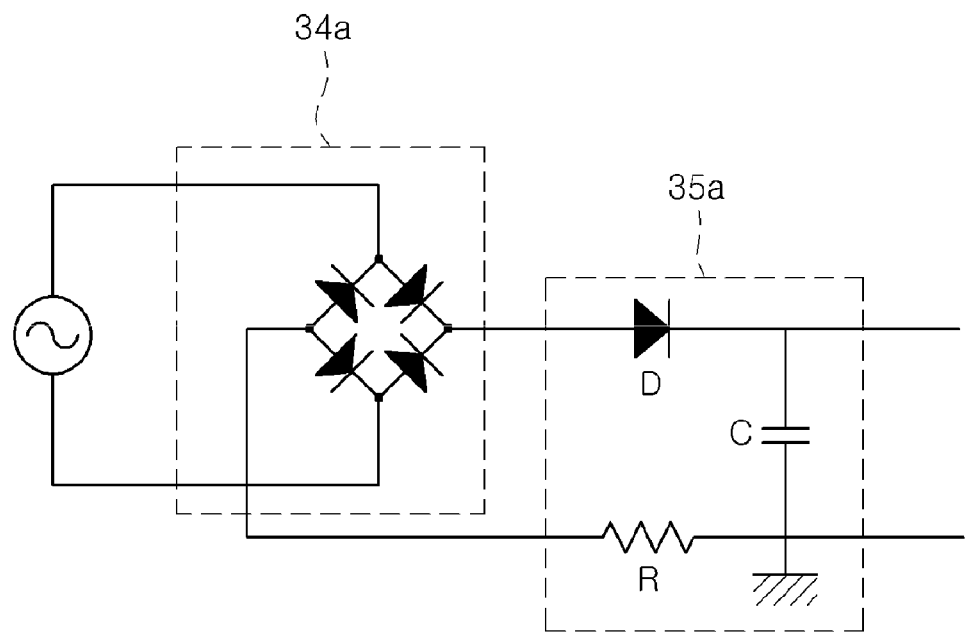
FIG. 5 is a diagram showing an exemplary AC-DC converter and an exemplary regulator in the illumination apparatus according to various embodiments.

The AC-DC converter 34 converts the AC power from the first and second sockets 11 and 12 into DC power, and the regulator 35 can output the DC power from the AC-DC converter 34 at a predetermined DC voltage. For example, as shown in FIG. 5, the AC-DC converter 34 and the regulator 35 may include a bridge rectifying circuit 34a and a smoothing (or filter) circuit 35a, comprising a diode D, a resistor R, and a capacitor C coupled between the outputs of the diode and the resistor (which may be upper and lower DC power supplies for the light emitting device driver 36). As described above, the power supply unit of the adapter 30 receives AC power from the first socket 11 and the second socket 12, and converts the AC power into DC power.

The light emitting device driver 36 outputs the DC voltage from the regulator 35 as a driving power suitable to drive the plurality of light emitting devices 21. In various embodiments, the drive signals for driving the plurality of light emitting devices 21 comprise one or more driving pulses.

Figure 6:
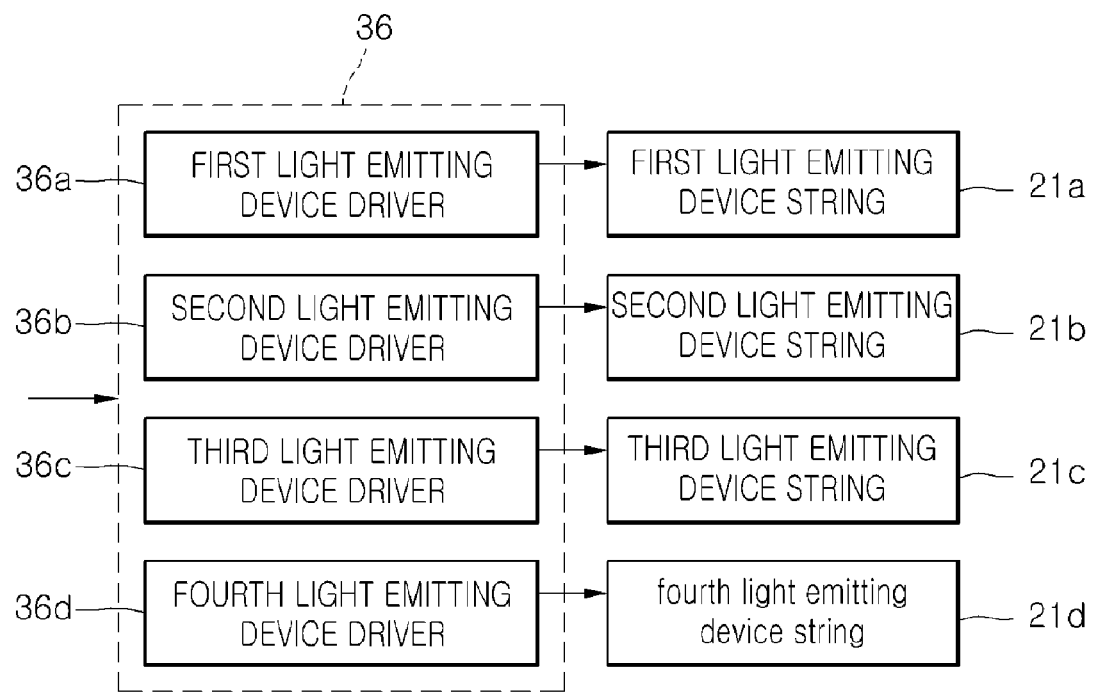
FIG. 6 is a diagram showing an exemplary light emitting device driver and exemplary light emitting device units in an illumination apparatus according to various embodiments.

For example, as shown in FIG. 6, the light emitting device driver 36 may include a first light emitting device driver 36a, a second light emitting device driver 36b, a third light emitting device driver 36c, and a fourth light emitting device driver 36d. Each of the first light emitting device driver 36a, the second light emitting device driver 36b, the third light emitting device driver 36c, and the fourth light emitting device driver 36d drives a respective subset of the light emitting devices 21 (e.g., first light emitting device string 21a, second light emitting device string 21b, third light emitting device string 21c, and fourth light emitting device string 21d) in the light emitting device unit 26 of the light emitting device illumination unit 20.

For example, the first light emitting device string 21a may comprise a plurality of LEDs or OLEDs connected in series that emit red light, the second light emitting device string 21b may comprise a plurality of LEDs or OLEDs connected in series that light emits green light, the third light emitting device string 21c may comprise a plurality of LEDs or OLEDs connected in series that emit blue light, and the fourth light emitting device string 21d may comprise a plurality of LEDs or OLEDs connected in series that emit white light.

Figure 7:
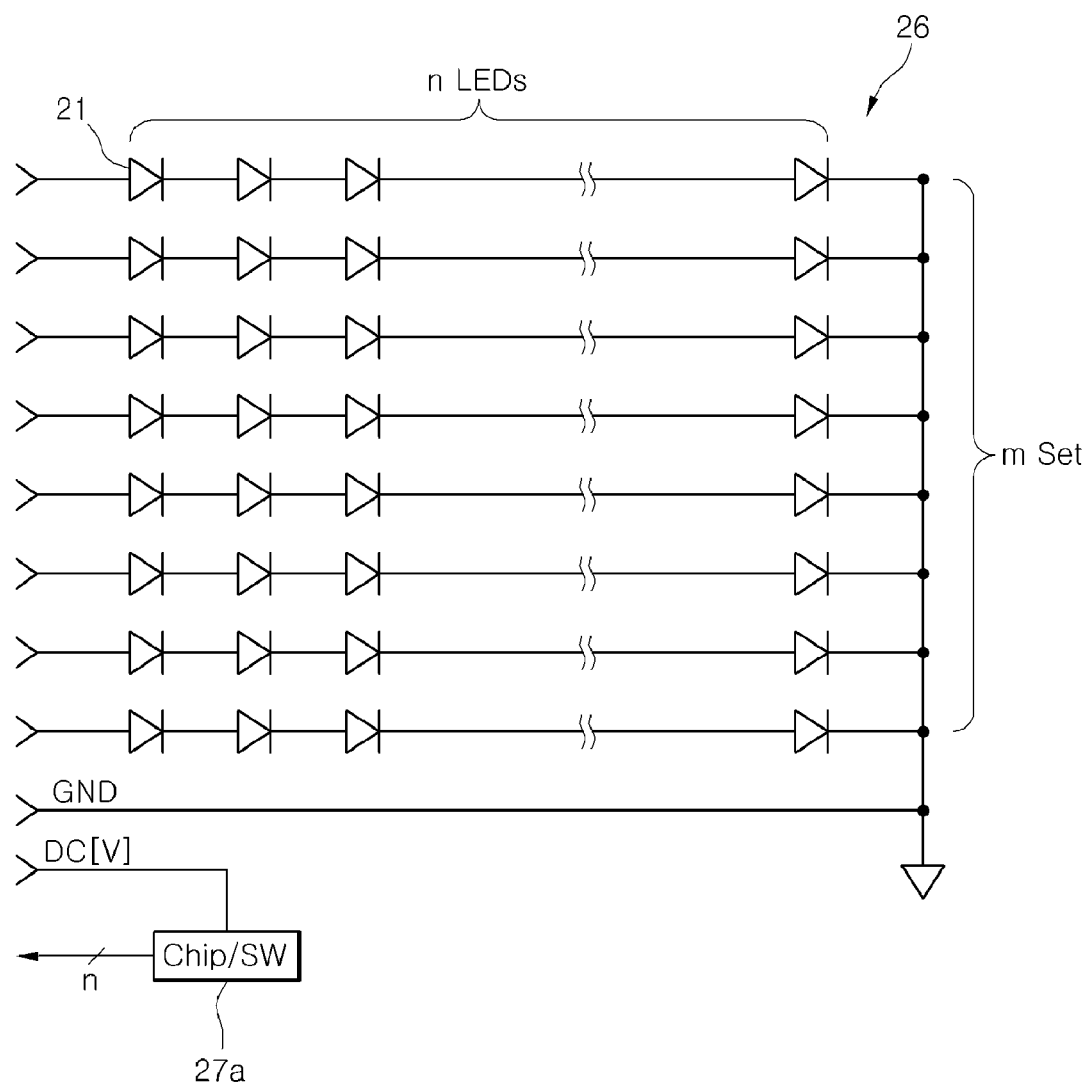
FIG. 7 is a diagram showing exemplary light emitting device units and an exemplary ramp information generator in the illumination apparatus according to various embodiments.

For example, as shown in FIG. 7, the light emitting device unit 26 may include a plurality of light emitting devices 21, and the plurality of light emitting devices 21 can form the plurality of light emitting device strings 21a-21d shown in FIG. 6. For example, FIG. 7 shows m LED strings to which n LEDs are connected in series, wherein m is an integer of from 1 to 7, and n is an integer of at least 2. When m is 1, the LED(s) 21 may emit white light. When m is 2, the LED(s) 21 may emit white light and another color or light, such as red, green or blue light. When m is 3, the LED(s) 21 may emit red, green and blue light. When m is 4, the LED(s) 21 may emit white, red, green and blue light.

Referring back to FIGS. 3 and 6, the controller 38 controls the first light emitting device driver 36a, the second light emitting device driver 36b, the third light emitting device driver 36c, and the fourth light emitting device driver 36d to control the length, on-off interval (e.g., cycle), power (e.g., voltage and/or current), etc., of the driving pulse for the first light emitting device string 21a, the second light emitting device string 21b, the third light emitting device string 21c, and the fourth light emitting device string 21d, thereby causing the light emitting device unit 26 to emit light having one or more various colors and/or patterns.

For example, when the driving pulse is applied to only the first light emitting device string 21a by driving only the first light emitting device driver 36a, the light emitting device illumination unit 20 may emit red light. When the driving pulse is applied to only the fourth light emitting device string 21d by driving only the fourth light emitting device driver 36d, the light emitting device illumination unit 20 may emit white light. Moreover, when all of the first through fourth light emitting device drivers 36a-36d apply driving pulses to the first through fourth light emitting device strings 21a-21d, the light emitting device illumination unit 20 emits more white light.

Referring back to FIG. 3, the controller 38 controls the first light emitting device driver 36a, the second light emitting device driver 36b, the third light emitting device driver 36c, and the fourth light emitting device driver 36d to drive the first light emitting device string 21a, the second light emitting device string 21b, the third light emitting device string 21c, and the fourth light emitting device string 21d.

For example, the controller 38 can provide different driving pulse information to the first light emitting device driver 36a, the second light emitting device driver 36b, the third light emitting device driver 36c, and the fourth light emitting device driver 36d, thereby making it possible to vary the color, brightness, saturation, flickering (e.g., on-off cycles), etc., of light emitted from the plurality of light emitting devices 21. The controller is also configured to receive instructions from the function block(s) 60 (through the function block slot(s) 30a) and/or the communication unit 39, and process such instructions to turn on and off light emitting devices 21 and/or the vary the color, intensity, pattern, etc. of light emitted from the plurality of light emitting devices 21.

Meanwhile, the exemplary light emitting device illumination unit 20 includes a lamp information generator 27. The lamp information generator 27 provides information on the light emitting device illumination unit 20 to the controller 38 of the adapter 30. The lamp information generator 27 may provide the information to the controller 39 by an electrical and/or mechanical method. FIG. 7 shows a chip 27a in which software (SW) including the information on the light emitting device illumination unit 20 is provided.

The information on the light emitting device illumination unit 20 may include, for example, one or more of the size information of the substrate 23, the type and number of the light emitting devices 21 on the substrate 23, the brightness and color information of light emitted from the light emitting device illumination unit 20, and the power information (e.g., including voltage and current information) suitable to drive the light emitting device illumination unit 20.

When the lamp information generator 27 is provided in a chip 27a as shown in FIG. 7, the lamp information generator 27 may receive a voltage (DC) from the adapter 30 or from the wiring on/in the substrate 23 of the light emitting device illumination unit 20 (after regulating the voltage to an appropriate value for the chip, if necessary), and the lamp information generator 27 supplies the lamp information to the controller 38. The controller 38 receives the lamp information, thereby making it possible to adaptively drive the light emitting device illumination unit 20 according to the lamp information. For example, the controller 38 may supply a voltage and/or current suitable for the light emitting device illumination unit 20 according to the power information in the lamp generator 27a. Also, the controller 38 may supply a driving signal to the light emitting device illumination unit 20 suitable to emit the desired brightness and color from the light emitting devices 21 according to the brightness and color information of the light that is emitted from the light emitting device illumination unit 20.

The communication unit 39 can communicate with a remote controller 50, and the controller 38 can be remotely controlled by the remote controller 50. The communication unit 39 and the remote controller 50 can communicate according to a wireless communication scheme, for example, a Zigbee standard.

The remote controller 50 includes a network interface 51 that transmits data to the communication unit 39, a key input unit 54 that inputs an operational command or instruction from a user, a display unit 52 that shows an operational state of the lamp to the user, and a controller 53 that controls the network interface 51 and the display unit 52 according to signal(s) from the key input unit 54. Therefore, the user can transmit control commands to the communication unit 39 using the remote controller 50, and the communication unit 39 transmits the control commands from the user to the controller 38, thereby making it possible to control the light emitting device illumination unit 20.

For example, the user can control emission of light of a specific color from the light emitting device illumination unit 20 using the remote controller 50. The controller 38 can selectively drive the first light emitting device driver 36a, the second light emitting device driver 36b, the third light emitting device driver 36c, and/or the fourth light emitting device driver 36d according to the signal input from the communication unit 39.

In addition, the user can turn on or turn off the light emitting device illumination unit 20 using the remote controller 50 after a predetermined time (e.g., 6:00 PM) or after a predetermined amount of time elapses (e.g., 3 hours). In other words, the controller 38 can control the on-off timing of light emitting device driver 36 by inputting a timer function.

The function block 60 is detachably connected to the function block slot 30a of the adapter 30 to connect to the controller 38. The function block 60 may include at least one of an infrared sensor, an image sensor, a motion sensor, a chemical sensor, a heat sensor, and a fire sensor. The function block 60 may also include hardware, firmware and/or software for programming a predetermined light pattern and/or on-off duration (timing) for the light emitting device unit 26. The adaptor 30 may include more than one function block slot 30a, in which case more than one function block 60 may be inserted and/or installed.

For example, the function block 60 can include an infrared sensor or a motion sensor to perform a security function, and when the motion of the user is sensed through the infrared/motion sensing, the function block 60 transmits the sensed signal to the controller 38, and the controller 39 can transmit the sensed information to the remote controller 50 through the communication unit 39.

In addition, the function block 60 can include an image sensor (e.g., camera) to perform a security function, and when the image obtained by the image sensor is transmitted to the controller 38, the controller 39 can transmit the image to the remote controller 50 through the communication unit 39.

In addition, the function block 60 can include a fire, heat or smoke sensor to perform the fire sensing function, and when the fire sensing is sensed through the fire sensor, the function block 60 transmits the sensed signal to the controller 38, and the controller 38 can transmit the sensed information to the remote controller 50 (or other designated apparatus, such as an alarm or a cellular telephone) through the communication unit 39. A speaker or other alarm (not shown) may be installed in the adapter 30 or in the function block 60, such that a fire alarm can be outputted from the speaker (e.g., by the controller 38 that obtains the fire sensing signal). Alternatively, the illumination apparatus can be turned on and off relatively quickly and repeatedly to accomplish a similar alarm function.

Of course, the user can perform various controls that include the turn on/off of the operation of the function block 60 through the remote controller 50.

As described above, the illumination apparatus according to the present disclosure can also use the existing power supply apparatus for fluorescent lamps that supplies AC power to the adapter 30 including the surge voltage absorber 33, the AC-DC converter 34, the regulator 35, and the light emitting device driver 36. In other words, as shown in FIG. 1, the power supply apparatus for the fluorescent lamp includes the ballast 10 converts commercial power into a high frequency current of 20 to 50 kHz, and first and second sockets 11 and 12 are connected to the ballast 10. Since only the high frequency AC current is supplied through the first and second sockets 11 and 12, the light emitting device illumination unit 20 cannot be directly installed in the existing power supply apparatus. However, the present illumination apparatus includes the adapter 30, making it possible to use the light emitting device illumination unit 20, while using the conventional power supply apparatus as it is.

Moreover, the present illumination apparatus can obtain information from the light emitting device illumination unit 20 in the adapter 30, making it possible to adaptively control the light emitting device illumination unit 20 according to the characteristics of the light emitting device illumination unit 20 that is connected to the adapter 30.

In addition, the illumination apparatus can be remotely controlled by the communication unit 39 performing communication with the remote controller 50.

In addition, the illumination apparatus includes the function block slot 30a and the function block 60 that is detachable to the function block slot 30a, thereby making it possible to perform various security functions and fire sensing functions, etc. together with the illumination function. Meanwhile, although the infrared sensor, the image sensor, and/or the fire sensor can be included in the function block 60, the communication unit 39 can also be included in the function block 60, such that it can be detachably installed in the adapter 30.

The embodiments of the present disclosure can provide an illumination apparatus using LEDs or OLEDs.

The present disclosure can provide an illumination apparatus using the LEDs or OLEDs that can be used without replacing the power supply apparatus for existing fluorescent lamps or halogen lamps.

The present disclosure can provide an illumination apparatus that can compatibly use various lamps by detachably installing the adapter and the lamp.

The present disclosure can provide the illumination apparatus that can adaptively control the lamp according to the type of the lamp that is installed.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is within the purview of one skilled in the art to effect such feature, structure, or characteristic in connection with other embodiments.

Although the present disclosure have been described with reference to a number of illustrative embodiments thereof, it should be understood that numerous other modifications and embodiments can be devised by those skilled in the art that will fall within the spirit and scope of the principles of this disclosure. More particularly, variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An illumination apparatus, comprising:
    an adapter that is detachably and electrically connected to a fluorescent lamp socket;
    a power supply unit in an adapter to supply power;
    a light emitting device driver that generates driving power from the power supplied by the power supply unit;
    a controller that controls the light emitting device driver;
    a function block slot electrically connected to the controller;
    a function block configured to be detachably couples to the function block slot; and
    a light emitting device illumination unit, detachably and electrically connected to the adapter, that emits light according to the driving power from the light emitting device driver and that electrically connects the power supply unit to another fluorescent lamp socket.

2. The illumination apparatus according to claim 1, wherein the light emitting device illumination unit includes a power wiring unit that electrically connects the power supply unit to the adapter.

3. The illumination apparatus according to claim 2, wherein the adapter and the light emitting device illumination unit are connected by a connector, the adapter supplies the driving power to the light emitting device driver through the connector, and the light emitting device illumination unit and the power supply unit are electrically connected through the connector.

4. The illumination apparatus according to claim 1, wherein the adapter includes a first power supply terminal to which AC power is supplied.

5. The illumination apparatus according to claim 2, wherein the light emitting device illumination unit includes the power wiring unit and a second power terminal to which AC power is supplied.

6. The illumination apparatus according to claim 1, wherein the light emitting device unit includes a plurality of light emitting devices.

7. The illumination apparatus according to claim 6, wherein the light emitting devices each comprise an LED or an OLED.

8. The illumination apparatus according to claim 1, wherein the power supply unit includes:
- a surge voltage absorber that absorbs a surge voltage from the AC power supply;
- an AC-DC converter that converts AC power from the surge voltage absorber into DC power; and
- a regulator that outputs DC power from the AC-DC converter at a predetermined DC voltage.

9. The illumination apparatus according to claim 1, wherein the function block is selected from the group consisting of an infrared sensor, an image senor, and a fire sensor.

10. An illumination apparatus, comprising:
- an adapter that is detachably and electrically connected to a fluorescent lamp socket;
- a function block slot electrically connected to the controller;
- a function block configured to be detachably coupled to the function block slot; and
- a light emitting device illumination unit, detachably and electrically connected to the adapter, having one side or end connected to the adapter and an opposite side or end connected to another fluorescent lamp socket, that electrically connects the adapter to another fluorescent lamp socket, and that emits light according to a driving power.

11. The illumination apparatus according to claim 10, wherein the adapter is electrically connected to any one of the fluorescent lamp sockets.

12. The illumination apparatus according to claim 11, wherein the adapter includes:
- a power supply unit that supplies power;
- a light emitting device driver that generates driving power from the power supplied by the power supply unit; and
- a controller that controls the light emitting device driver.

13. The illumination apparatus according to claim 11, wherein the light emitting device illumination unit includes a power wiring unit that electrically connects one of the sockets to the adapter.

14. The illumination apparatus according to claim 10, wherein the light emitting device illumination unit includes a plurality of light emitting devices.

15. The illumination apparatus according to claim 14, wherein the light emitting devices each comprise an LED or an OLED.

16. The illumination apparatus according to claim 10, wherein the adapter and the light emitting device illumination unit are connected by a connector, the adapter supplies the driving power to the light emitting device driver through the connector, and the light emitting device illumination unit and the power supply unit are electrically connected through the connector.

17. The illumination apparatus according to claim 10, wherein the function block is selected from the group consisting of an infrared sensor, an image sensor, and a fire sensor.

* * * * *